United States Patent [19]

Cruse

[11] Patent Number: 4,494,728
[45] Date of Patent: Jan. 22, 1985

[54] BELL-MOUTH PORTS FOR PNEUMATIC COUPLINGS USING O-RINGS

[75] Inventor: Lee H. Cruse, Ozark, Mo.
[73] Assignee: Foster Manufacturing Company, Springfield, Mo.
[21] Appl. No.: 385,579
[22] Filed: Jun. 7, 1982
[51] Int. Cl.³ .............................................. F16L 37/28
[52] U.S. Cl. ........................... 251/149.9; 251/DIG. 1; 408/223
[58] Field of Search .................... 251/149.9, 344, 347, 251/DIG. 1; 408/223, 224

[56] References Cited

U.S. PATENT DOCUMENTS

| 1,753,935 | 4/1930 | Maisch | 408/223 |
| 3,106,378 | 10/1963 | Hellstern | 251/149.9 |
| 3,106,379 | 10/1963 | Sciuto et al. | 251/149.9 |
| 3,127,149 | 3/1964 | Cruse | 251/149.9 |
| 3,140,072 | 7/1964 | Sciuto, Jr. | 251/149.9 |
| 3,477,688 | 11/1969 | Cruse | 251/149.9 |
| 4,277,031 | 7/1981 | Moumaneix et al. | 251/DIG. 1 |

FOREIGN PATENT DOCUMENTS 567448  2/1945  United Kingdom ............... 408/223

Primary Examiner—A. Michael Chambers
Attorney, Agent, or Firm—Rogers, Eilers, Howell, Renner, Moore & Haferkamp

[57] ABSTRACT

O-rings, which are disposed within pneumatic couplings and which are recurrently moved past ports within those pneumatic couplings, tend to be abraded as they recurrently engage the changes of surface at the mouths of those ports. The present invention minimizes the abrading of the O-rings by providing the ports with bell mouths which merge smoothly into at least two spaced points on the surface of the body in which the ports are located.

7 Claims, 4 Drawing Figures

U.S. Patent  Jan. 22, 1985  4,494,728
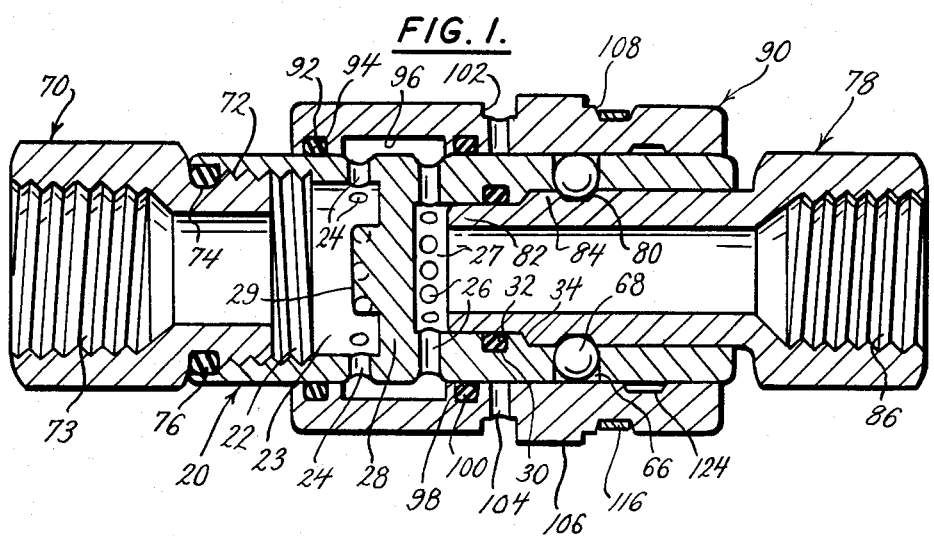
FIG. 1.
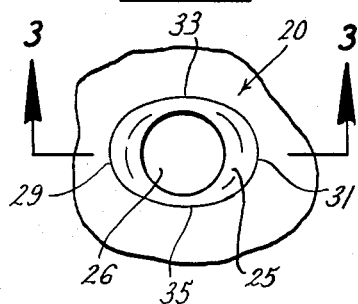
FIG. 2.
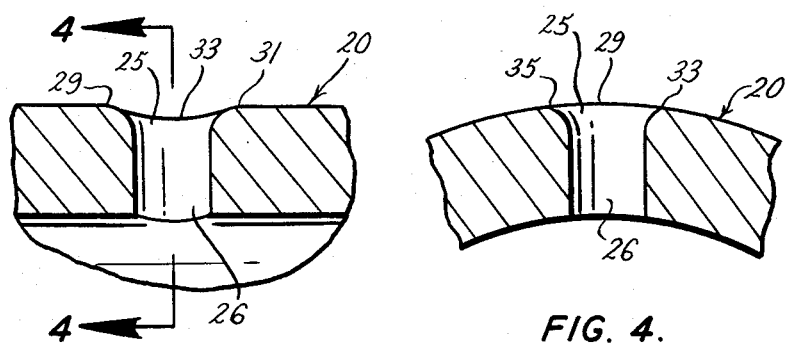
FIG. 3.
FIG. 4.

BELL-MOUTH PORTS FOR PNEUMATIC COUPLINGS USING O-RINGS

BACKGROUND OF THE INVENTION

1. Field of the Invention

The present invention relates to pneumatic couplings wherein O-rings are recurrently moved across the mouths of ports. Many of those pneumatic couplings are used as on-off valves as well as quick connect-disconnect couplings.

2. Description of the Prior Art

In pneumatic couplings, which are used as on-off valves as well as quick connect-disconnect couplings, O-rings are recurrently moved back and forth across the mouths of ports. As pointed out in lines 49–51 of column 3 of my U.S. Pat. No. 3,127,149 for Valved Hose Couplings which was granted March 31, 1964:

"O Rings 38, 39 * slidably, but, nevertheless, snugly engage the outer surfaces of the barrel 1 so as to provide seals".

The O-ring 38 recurrently passes over the mouths of ports 10 as a "valve forming sleeve 34" (Col. 3, L. 44,45), which is "internally undercut to provide two axially spaced narrow grooves 35,36" (Col. 3, L.46,47) for that O-ring and an O-ring 39, is "shifted to 'open' position, as shown in FIG. 2" (Col. 4, L. 61) or to "a closed position" (Col. 4, L. 71).

In pneumatic couplings wherein the ports are of constant diameter throughout their lengths, the edges of the mouths of the ports tend to abrade the O-rings, as those O-rings recurrently engage those edges—even where those edges are carefully machined and ground to eliminate burrs and rough spots. Efforts have been made to chamfer or otherwise reduce the sharpness of the edges of the mouths of the ports in pneumatic couplings; but even where the edges of ports have been chamfered or have otherwise had the sharpness thereof reduced, the abrading of the O-rings by those edges seriously limits the life of those O-rings. The replacement of some O-rings within pneumatic couplings can be very difficult, timeconsuming and expensive; and some users discard pneumatic couplings rather than try to replace the O-rings therein.

SUMMARY OF THE INVENTION

The present invention greatly increases the life of O-rings within pneumatic couplings by providing bell mouths for the ports across which the O-rings must be moved, and by having those mouths merge smoothly into at least two spaced points on the surface of the body in which the ports are located. The O-rings will engage the edges of the bell mouths of the ports, as those O-rings are moved back and forth across those bell mouths, but those edges will not be sharp. As a result, O-rings in pneumatic couplings, which are equipped with the bell mouth ports provided by the present invention, have shown little or no abrasion after one hundred thousand actuations of those couplings wherein those O-rings were moved back and forth across the mouths of the ports. It is, therefore, an object of the present invention to provide ports, that are within a pneumatic coupling which has an O-ring moved across the mouths thereof, with bell mouths that have edges which merge smoothly into at least two spaced points on the surface of the body in which the ports are located.

In a preferred embodiment of the present invention, the mouths of the ports are made by a rotatable tool with a convex working face. The configuration of that convex working face causes the resulting bell mouth of each port to be tangential to at least two spaced points on the surface of the body in which the ports are located. The resulting absence of perceptible changes of surface between the bell mouth and those two spaced points reduces potential abrading of the O-rings at those points to an irreducible minimum. Also, the convex portions of the bell mouth, adjacent other points on the surface of the body in which the ports are located, minimize potential abrading of the O-rings at those other points. As a result, very long lives are provided for the O-rings which are recurrently moved back and forth across the mouths of those ports. It is, therefore, an object of the present invention to provide ports, that are within a pneumatic coupling which has an O-ring moved across the mouths thereof, with bell mouths that are tangential to at least two spaced points on the surface of the body in which the ports are located.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing, FIG. 1 is a longitudinal section through one preferred embodiment of pneumatic coupling in which the ports of the present invention are incorporated;

FIG. 2 is a plan view, on a larger scale, of one of the ports in the pneumatic coupling of FIG. 1, FIG. 3 is a sectional view, on the scale of FIG. 2, which is taken along the plane indicated by the line 3—3 in FIG. 2, and FIG. 4 is a sectional view, on the scale of FIG. 2, which is taken along the plane indicated by the line 4—4 in FIG. 3.

DETAILED DESCRIPTION OF PREFERRED EMBODIMENT

Referring to the drawing in detail, the numeral 20 generally denotes a tubular socket which constitutes the female member of one preferred embodiment of quick connect-disconnect coupling for fluid lines. An internal thread 22 is provided at the left-hand end of that socket; and that internal thread constitutes part of the inner surface of a cavity 23 which extends inwardly from the left-hand end of that socket and which has the inner end thereof defined by a partition 28. A cylindrical boss 29 extends into that cavity from the left-hand face of that partition, as shown particularly by FIG. 1. A number of radially-directed ports 24 are formed in the wall of cavity 23 adjacent the inner end of that cavity.

The numeral 27 denotes a cavity which is coaxial with the cavity 23 but which is separated from that cavity by the partition 28. The cavity 27 extends to the right-hand end of the socket 20, as shown by FIG. 1. A number of radially-directed ports 26 extend through the wall of cavity 27; and those ports are disposed to the right of the partition 28, as shown by FIG. 1. The partition 28 prevents direct communication between the cavities 23 and 27.

The numeral 30 denotes an annular groove in the inner surface of the cavity 27; and that groove is disposed to the right of the ports 26. An O-ring 32 is disposed within that annular groove; and the diameter of a transverse section of that O-ring is greater than the depth of the groove 30. As a result, the inner surface of that O-ring normally projects into the cavity 27.

An inclined annular shoulder 34 constitutes part of the inner surface of the cavity 27; and that shoulder is disposed to the right of the annular groove 30, as shown by FIG. 1. That shoulder interconnects a large diameter, right-hand portion of cavity 27 with a small diameter, left-hand portion of that cavity. The numeral 66 denotes a plurality of radially-directed, circumferentially-spaced recesses in the wall of socket 20; and those recesses are disposed to the right of the annular shoulder 34, as indicated by FIG. 1. The inner ends of those recesses are smaller in cross section than the rest of those recesses. Balls 68 are disposed in those recesses; and they can have the inner ends thereof extending inwardly of the cylindrical inner surface of the right-hand portion of cavity 27, as shown by FIG. 1. However, the reduced diameter inner ends of recesses 66 will limit the extent to which the balls 68 can move inwardly of that cylindrical inner surface. The diameter of each ball 68 is greater than the wall thickness of the right-hand portion of cavity 27, as shown by FIG. 1. The socket 20 is made from a single piece of metal.

The numeral 70 generally denotes a supply fitting of standard and usual design; and that supply fitting has an external thread 72 which mates with the internal thread 22 of socket 20. An annular groove 74 is provided in the outer surface of the supply fitting 70 adjacent the left-hand end of the external thread 72. An internal thread 73 is provided at the left-hand end of that supply fitting; and that internal thread will receive the external thread of a hose barb, not shown, for a pressurized fluid such as compressed air. An O-ring 76 is disposed within the annular groove 74; and it will be compressed as the external thread 72 is rotated inwardly relative to the internal thread 22 of socket 20. That O-ring will provide an air-tight seal between the internal thread 22 and the external thread 72.

The numeral 78 generally denotes a tubular plug which constitutes the male member of the preferred embodiment of quick connect-disconnect coupling for fluid lines. The left-hand end of that plug is denoted by the numeral 82, and it is dimensioned to telescope within the small diameter left-hand portion of cavity 27 of socket 20, as shown by FIG. 1. That left-hand end of that plug will expand the O-ring 32, which is disposed within the groove 30; and that O-ring will provide an air-tight seal between plug 78 and socket 20. An annular rib 84 which has inclined faces is disposed between, and helps define, the inner end 82 and an annular groove 80, as shown by FIG. 1. That groove is dimensioned to accommodate the inner portions of the balls 68. The left-hand inclined face of annular rib 84 will serve as an inclined plane to move the balls 68 outwardly of the recesses 66 as the plug 78 has the reduced-diameter left-hand end 82 thereof telescoped within the small diameter left-hand portion of the cavity 27. The right-hand inclined face of annular rib 84 will serve as an inclined plane to move the balls 68 outwardly of the recesses 66 as the plug 78 is moved to the right from the positon of FIG. 1. An internal thread 86 is provided adjacent the right-hand end of plug 78; and that thread will accommodate the external thread on a hose barb, not shown, for a pressurized fluid such as compressed air.

The numeral 90 generally denotes a sleeve which is dimensioned to telescope over, and to closely encircle, the outer surface of socket 20. An annular groove 92 is provided at the inner surface of that sleeve adjacent the left-hand end of that sleeve, as shown by FIG. 1. An O-ring 94 is disposed within that groove; and that O-ring will be compressed, and hence will provide a fluid-tight seal between sleeve 90 and socket 20, whenever that sleeve is telescoped over that socket. An annular recess 96 is formed in the inner surface of sleeve 90 a short distance to the right of the annular groove 92; and that recess has an axial dimension which enables it to simultaneously communicate with ports 24 and 26, as indicated by FIG. 1. However, the axial dimension of annular recess 96 is short enough so that recess can be wholly displaced away from the ports 26. The numeral 98 denotes an annular groove which is formed in the inner surface of sleeve 90 and which is disposed a short distance to the right of annular recess 96. An O-ring 100 is disposed within the groove 98; and that O-ring will be compressed, and hence will provide a fluid-tight seal between sleeve 90 and socket 20, whenever that sleeve is telescoped over that socket. An annular groove 102 is provided in the external surface of the sleeve 90 at a point which is displaced a short distance to the right of the annular groove 98, as shown by FIG. 1. A number of circumferentially-displaced, radially-directed holes 104 are provided in the sleeve 90; and the outer ends of those holes communicate with the annular groove 102, as shown by FIG. 1.

An annular knurled surface 106 is provided at the exterior of the sleeve 90; and that knurled surface is disposed to the right of the external annular groove 102. That annular knurled surface helps the user of the quick connect-disconnect coupling apply reciprocative and rotative forces to that sleeve. An annular groove 108 is formed in the outer surface of the sleeve 90 adjacent the right-hand end of the knurled portion 106. A hole, not shown, which is provided in the sleeve 90 has the outer end thereof communicating with the annular groove 108. A radially-directed hole, not shown, which is provided in the sleeve 90 has the outer end thereof communicating with the annular groove 108; and the inner end of that hole communicates with the interior of that sleeve. A further radially-directed hole, not shown, which is provided in the sleeve 90 has the outer end thereof communicating with the annular groove 108; and the inner end of that hole communicates with the interior of that sleeve. That recess and those radially-directed holes can be identical to the corresponding recess and radially-directed holes in my copending application Ser. No. 104,307 for QUICK CONNECT-DISCONNECT COUPLING FOR FLUID LINES which was filed on Dec. 17, 1979 now abandoned.

The numeral 116 denotes a split-ring spring which is disposed within the annular groove 108. That spring preferably is identical to, and performs the same function as, a similarly-numbered spring in my said application.

The numeral 124 denotes an annular groove in the inner surface of sleeve 90; and that groove is displaced to the right of the external annular groove 108, as shown by FIG. 1. The annular groove 124 is dimensioned to accommodate the outer portions of the balls 68 which are held within the recesses 66 of socket 20.

The quick connect-disconnect coupling for fluid lines, which is provided by the present invention, differs from the quick connect-disconnect coupling for fluid lines of said application by having bell mouths 25 for the ports 26. Those bell mouths have convex faces which merge smoothly into the axially-spaced points 29 and 31 on the surface of the socket 20. In fact, those convex faces are tangential to the surface of the socket 20 at those points; and hence there are no perceptible changes of surface between the bell mouth 25 at those two points. The points 29 and 31 lie in a plane which passes through the axis of the socket 20 and also passes through the axis of the port 26.

Where the port 26 is formed by a rotating tool, there will be perceptible changes of surface between the bell mouth 25 and those portions of the surface of socket 20 which define the edge of that bell mouth at locations remote from the points 29 and 31. Thus, as shown by FIG. 4, there are perceptible changes of surface between the bell mouth 25 and those portions of the surface of socket 20 which define the edge of that bell mouth at the points 33 and 35 which are displaced ninety degrees from the points 29 and 31. Progressively-smaller changes of surface will be noted along the portions of the edge of bell mouth 25 which extend between point 33 and points 29 and 31; and, similarly, progressively-smaller changes of surface will be noted along the portions of the edge of bell mouth 25 which extend between point 35 and points 29 and 31.

The absence of perceptible changes of surface between the bell mouth 25 and the surface of the tubular socket 20 at the points 29 and 31 reduces, to an irreducible minimum, the likelihood of the O-ring 100 being abraded at those points. The perceptible changes of surface between the bell mouth 25 and the surface of the socket 20 at the points 33 and 35 will not cause any abrading of the O-ring 100, because the direction of movement of that O-ring will be tangential to that bell mouth at those points. The section of the edge of the bell mouth 25, which is between the point 35 and the point 31, will have progressively-smaller changes of surface; and, importantly, the portions of that section which have readily-perceptible changes of surface are displaced from the direction of movement of the O-ring 100 by just a limited number of degrees, and the portions of that section which are displaced from the direction of movement of that O-ring by a large number of degrees have much smaller changes of surface. The sections of the edge of the bell mouth 25, which are between point 35 and point 29, which are between point 33 and point 29, and which are between point 33 and point 31 have progressively-smaller changes of surface that are essentially the same as the progressively-smaller changes of surface between point 35 and point 31. Also, the portions of those sections which have readily-perceptible changes of surface are displaced from the direction of movement of the O-ring 100 by just a limited number of degrees, and the portions of those sections which are displaced from the direction of movement of that O-ring by a large number of degrees have much smaller changes of surface. In addition, the convex nature of all of the sections of the edge of the bell mouth 25 will enable those sections to gently urge the confronting portions of the O-ring 100 outwardly with minimum abrading effect as those portions engage those sections.

The overall results of these features of bell mouth 25 are (a) that where the direction of movement of the O-ring 100 is dominantly transverse of a section of the edge of that bell mouth, the change of surface at that section is either imperceptible or very small, (b) that where a section of the edge of that bell mouth has a readily-perceptible change of surface, the direction of movement of that O-ring is dominantly lengthwise of that section, and (c) that all sections of the edge of that bell mouth gently urge the confronting portions of that O-ring outwardly with minimum abrading effect as those portions engage those sections. The use of the bell mouth 25 has dramatically increased the life of O-rings in pneumatic couplings which are used as on-off valves. For example, where a quick connect-disconnect valve-type coupling had standard, constant-diameter ports, the O-ring was badly abraded after that O-ring had been moved back and forth across those ports as few as ten thousand times; but where a similar quick connect-disconnect valve-type coupling had ports with bell mouths 25, the O-ring showed essentially no signs of abrading even after that O-ring had been moved back and forth across those ports one hundred thousand times.

The bell mouth 25 is shown as having a surface which was developed by rotating a true arc about the axis of the port 26. If desired, that bell mouth could have a surface which was developed by rotating a curved line, which was not a true arc, about the axis of that port. Importantly, any bell mouth 25 should be tangential or substantially tangential, to the two points on the edge of that bell mouth which lie in a plane that passes through the axis of the tubular socket and that also passes through the axis of the port.

Whereas the drawing and accompanying description have shown and described a preferred embodiment of the present invention, it should be apparent to those skilled in the art that various changes may be made in the form of the invention without affecting the scope thereof.

What I claim is:

1. In a body which has a surface against which an O-ring bears during relative reciprocation of that body and of that O-ring and which has a port that opens to that surface, the improvement which comprises a bell mouth for said port, said bell mouth having a continuous and unbroken convex surface which is completely free of all straight lines and which merges smoothly and without any breaks or apexes into said surface at two points which are spaced apart along said surface in the direction of relative reciprocation of said body and of said O-ring, said bell mouth having a convex face tangential to said surface of said body at said points.

2. In a body as claimed in claim 1 wherein said two points lie in a plane which passes through the axis of said body and which also passes through the axis of said port.

3. In a body as claimed in claim 1 wherein said convex surface of said bell mouth is defined by a convex line which is rotated about the axis of the port.

4. In a body which has a surface against which an O-ring bears during relative reciprocation of that body and of that O-ring and which has a port that opens to that surface, the improvement which comprises a bell mouth for said port having a continuous and unbroken convex shape which is completely free of all straight lines and which merges smoothly and without any breaks or apexes into said surface with substantially imperceptible changes of surface at two points which are spaced apart along said surface, said bell mouth having a convex face tangential to said surface of said body at said points.

5. In a body as claimed in claim 4 wherein said two points lie in a plane which passes through the axis of said body and which also passes through the axis of said port.

6. In a body which has a surface against which an O-ring bears during relative reciprocation of that body and of that O-ring and which has a port that opens to that surface, the improvement which comprises a mouth for said port having a continuous and unbroken convex surface which is completely free of all straight lines and which merges smoothly and without any breaks or apexes into said surface at two points which are spaced apart along said body surface in the direction of the relative reciprocation of said body and said O-ring, with some substantially imperceptible changes of surface and also with some readily-perceptible changes of surface, said substantially imperceptible changes of surface being transverse of said direction of relative reciprocation of said body and of said O-rings, said readily-perceptible changes of surface being generally lengthwise of said direction of relative reciprocation of said body and of said O-ring, said mouth having a convex face tangential to said surface to said body at said points.

7. In a body which has a surface against which an O-ring bears during relative reciprocation of that body and of that O-ring and which has a port that opens to that surface, the improvement which comprises a mouth for said port that has a continuous and unbroken surface which is convex and which is completely free of all straight lines and which merges smoothly and without any breaks or apexes into said surface at two points which are spaced apart along said surface in the direction of relative reciprocation of said body and of said O-ring to enable the edge of said mouth to gently urge said O-ring outwardly of said mouth during said relative reciprocation of said body and of said O-ring, said bell mouth having a convex face tangential to said surface of said body at said points.

* * * * *